United States Patent
Kalinichenko (10) Patent No.: US 8,850,579 B1
(45) Date of Patent: Sep. 30, 2014

(54) APPLICATION OF NESTED BEHAVIORAL RULES FOR ANTI-MALWARE PROCESSING

(75) Inventor: Michael Kalinichenko, Moscow (RU)

(73) Assignee: SNS Soft LLC, Moscow (RU)

( * ) Notice: Subject to any disclaimer, the term of this patent is extended or adjusted under 35 U.S.C. 154(b) by 766 days.

(21) Appl. No.: 12/618,079

(22) Filed: Nov. 13, 2009

(51) Int. Cl.
- G06F 11/00 (2006.01)
- G06F 12/14 (2006.01)
- G06F 12/16 (2006.01)
- G08B 23/00 (2006.01)

(52) U.S. Cl.
USPC ............................ 726/23; 726/22; 726/24

(58) Field of Classification Search
CPC ..... G06F 21/55; G06F 21/552; G06F 21/554; G06F 21/56; G06F 21/562; G06F 21/564; G06F 21/566
USPC ..................................................... 726/22–26
See application file for complete search history.

(56) References Cited

U.S. PATENT DOCUMENTS

| | | | |
|---|---|---|---|
| 7,356,736 B2 * | 4/2008 | Natvig ........................ 714/38.12 |
| 7,376,969 B1 * | 5/2008 | Njemanze et al. ............... 726/22 |
| 7,620,992 B2 * | 11/2009 | Monastyrsky et al. ......... 726/24 |
| 7,770,472 B2 * | 8/2010 | Isono et al. ............... 73/862.625 |
| 7,779,472 B1 * | 8/2010 | Lou ................................ 726/24 |
| 7,870,612 B2 * | 1/2011 | Liu ................................. 726/24 |
| 7,877,809 B1 * | 1/2011 | Sutton et al. .................... 726/24 |
| 7,934,261 B1 * | 4/2011 | Saguiguit et al. ............... 726/24 |
| 8,151,352 B1 * | 4/2012 | Novitchi ......................... 726/24 |
| 8,176,527 B1 * | 5/2012 | Njemanze et al. ................ 726/2 |
| 8,627,458 B2 * | 1/2014 | Muttik ........................... 726/22 |
| 2004/0068662 A1 * | 4/2004 | Ho et al. ........................ 713/200 |
| 2005/0240999 A1 * | 10/2005 | Rubin et al. .................... 726/22 |
| 2007/0079375 A1 * | 4/2007 | Copley ........................... 726/22 |
| 2007/0240215 A1 * | 10/2007 | Flores et al. .................... 726/24 |
| 2009/0064323 A1 * | 3/2009 | Lin ................................. 726/22 |
| 2010/0154056 A1 * | 6/2010 | Smith et al. .................... 726/22 |
| 2011/0023118 A1 * | 1/2011 | Wright ........................... 726/23 |
| 2011/0083186 A1 * | 4/2011 | Niemela et al. ................. 726/24 |

\* cited by examiner

*Primary Examiner* — Tae Kim (74) *Attorney, Agent, or Firm* — Bardmesser Law Group (57) ABSTRACT

A system, method and computer program product for implementing dynamic behavior rules for malware detection. A method of heuristic analysis of computer program execution is used. A behavior of a computer program is monitored, analyzed and blocked in runtime. Actions performed or triggered by each executable component are compared against a set of behavioral rules. The behavioral rules determine wherever the requested action is allowed or blocked, and which new behavioral rules are needed to be applied to future actions. Executed actions (allowed or blocked) introduce new dynamic behavioral rules to the computer system, which in turn can apply these rules for analyzing behavior of subsequent components executed on the computer system.

18 Claims, 5 Drawing Sheets

APPLICATION OF NESTED BEHAVIORAL RULES FOR ANTI-MALWARE PROCESSING

BACKGROUND OF THE INVENTION

1. Field of the Invention

The present invention is related to anti-malware technology, and more particularly, to detection of malware based on heuristic analyses of computer programs and application of dynamic nested behavioral rules.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers through communications or file exchanges is an increasingly significant consideration. Infections take various forms, but are typically related to computer viruses, Trojan programs, rootkits or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional approach to detecting viruses is signature scanning. Signature scanning systems use sample code patterns extracted from known malware code and scan for the occurrence of these patterns in other program code. A primary limitation of the signature scanning method is that only known malicious code is detected, that is, only code that matches the stored sample signatures of known malicious code is identified as being infected. All viruses or malicious code not previously identified, and all viruses or malicious code created after the last update to the signature database, will not be detected.

In addition, the signature analysis technique fails to identify the presence of a virus if the signature is not aligned in the code in the expected fashion. Alternatively, the authors of a virus may obscure the identity of the virus by opcode substitution or by inserting dummy or random code into virus functions. Nonsense code can be inserted that alters the signature of the virus to a sufficient extent as to be undetectable by a signature scanning program, without diminishing the ability of the virus to propagate and deliver its payload.

Another virus detection strategy is integrity checking. Integrity checking systems extract a code sample from known, benign application program code. The code sample is stored, together with information from the program file, such as the executable program header and the file length, as well as the date and the time stamp of the sample. The program file is checked at regular intervals against this database to ensure that the program file has not been modified.

Integrity checking programs generate long lists of modified files when a user upgrades the operating system of the computer or installs or upgrades application software. A main disadvantage of an integrity check-based virus detection system is that a great many warnings of virus activity issue whenever any modification of an application program is performed. It is difficult for a user to determine when a warning represents a legitimate attack on the computer system.

One of the most effective techniques for detecting computer malware is heuristic analysis of computer programs. The heuristic analysis is a behavior-based technique in which actions of a suspect computer program are analyzed for known malicious actions, such as replication, file overwrites, attempts to hide files, attempts of registry access, sending sensitive information or receiving malicious code over a network, etc.

If one or more of the malicious actions are detected, the program is flagged as a potential malware. While heuristic analysis enabled detection of various classes of malware, heuristic analysis approach may fail to detect some forms of malware with complex behavioral patterns. In particular, heuristic analysis fail against malware performing a sequence of actions distributed between different program components or numerous applications. It is also ineffective in protecting against rootkit type of malware that acts over a long period of time. Additionally, conventional systems using heuristic analysis employ hundreds of rules. This imposes a burden on system resources, as all of the rules need to be loaded and processed by the system.

It is apparent that improved method and techniques for protecting against malware with complex behavior patterns are required. Accordingly, there is a need in the art for a system and method that addresses the need for protection against malware by detecting complex behavior patterns without employing a large number of rules.

SUMMARY OF THE INVENTION

The present invention is intended as a method and system for detection of malware based on heuristic analyses of computer programs and application of dynamic nested behavioral rules that substantially obviates one or several of the disadvantages of the related art.

In one aspect of the invention there is provided a system, method and computer program product for implementing dynamic behavior rules for malware detection. A method of heuristic analysis of computer program execution is used. According to an exemplary embodiment, behavior of a computer program can be monitored, analyzed and blocked during operating system execution. Actions performed or triggered by each executable component are compared against a set of behavioral rules.

The behavioral rules determine wherever the requested action is allowed or blocked, and which new behavioral rules are needed to be applied to future actions. Therefore, any executed action (allowed or blocked), can introduce new dynamic behavioral rules to the computer system, which, in turn, can apply these rules for analyzing behavior of subsequent components executed on the computer system.

According to the exemplary embodiment, the implementation of the dynamic behavior rules provides for protection against malware that performs a large number of various actions over a long period of time. Only a subset of rules is used at system startup and additional rules are dynamically added in runtime. Thus, the system resources are saved.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for malware detection using dynamic behavioral rules are provided. In one aspect of the invention there is provided a method for implementing dynamic behavior rules for malware detection. A method of heuristic analysis of computer program execution is employed.

According to the exemplary embodiment, behavior of a computer program is monitored, analyzed and blocked (if necessary) during its execution. Actions performed or instantiated by each executable component are compared against a set of static and dynamic behavioral rules.

The behavioral rules determine whether the requested action is allowed or blocked. The system also determines which new behavioral rules are needed to be applied to future actions performed by an executable component (or application). Any executed action (allowed or blocked) can introduce new dynamic behavioral rules to the computer system. Note that not every action introduces new rules as the new rules have to be defined in a reaction directive. Then, the computer system can apply the additional rules for analyzing behavior of subsequent components executed on the computer system.

According to the exemplary embodiment, the implementation of the dynamic nested behavior rules provides for protection against complex malware that performs a large number of various actions over a long period of time. The behavioral rules can be static and dynamic. The static rules are loaded and applied by security enforcement application (i.e., an AV module) during system startup. The dynamic rules are generated and applied by security enforcement application at runtime.

Behavioral rule is a function of computer program behavior:

f(set of program action descriptions)=reaction description.

A program action is an execution of a specific operating system code (i.e., a system function call), or a sequence of operating system codes (such as for example, file operations, registry operations, and network operations, etc.). A reaction description contains a directive as to whether the action should be allowed or blocked. The reaction description also provides a directive as to what new nested behavioral rules are to be dynamically introduced to the system based on the action. Note that the reaction directive can introduce the new rules regardless of the action being blocked or allowed. The proposed approach allows automatic generation of behavioral rules customized to the current execution environment based on current heuristic analysis.

Implementation of dynamically nested behavior rules can be best illustrated by a generic example: a malware behavioral pattern includes several sequential actions.

Program X reads file A;

Then, some time later program X reads file B;

Then, some time later program X writes to a system registry key C;

Then, some time later program Y reads the registry key C;

Then, some time later program Y opens network connection to peer D.

Each of these exemplary actions can be harmless on its own, however, executed by the same program in the described sequence can be caused by malware execution. Verbalization of behavioral rule for the security threat presented by the above actions can read as follows:

If a program X reads file A, then generate a new behavioral rule stating that. If the program X reads file B, then generate a new behavioral rule stating that. If the program X writes to system registry key C, then generate a new behavioral rule stating that. If the program Y reads registry key C, then generate a new behavioral rule stating that. If a program Y opens network connection to peer D, then block the attempt to open network connection, stop execution of the program X and stop execution of the program Y, and generate a new behavioral rule stating that. If the program X attempts to execute, then block the attempt and generate a new behavioral rule. If the program Y attempts to execute, then block the attempt as well. An exemplary computer executable script generated in this example is provided in the appendix 1 below.

Figure 1:
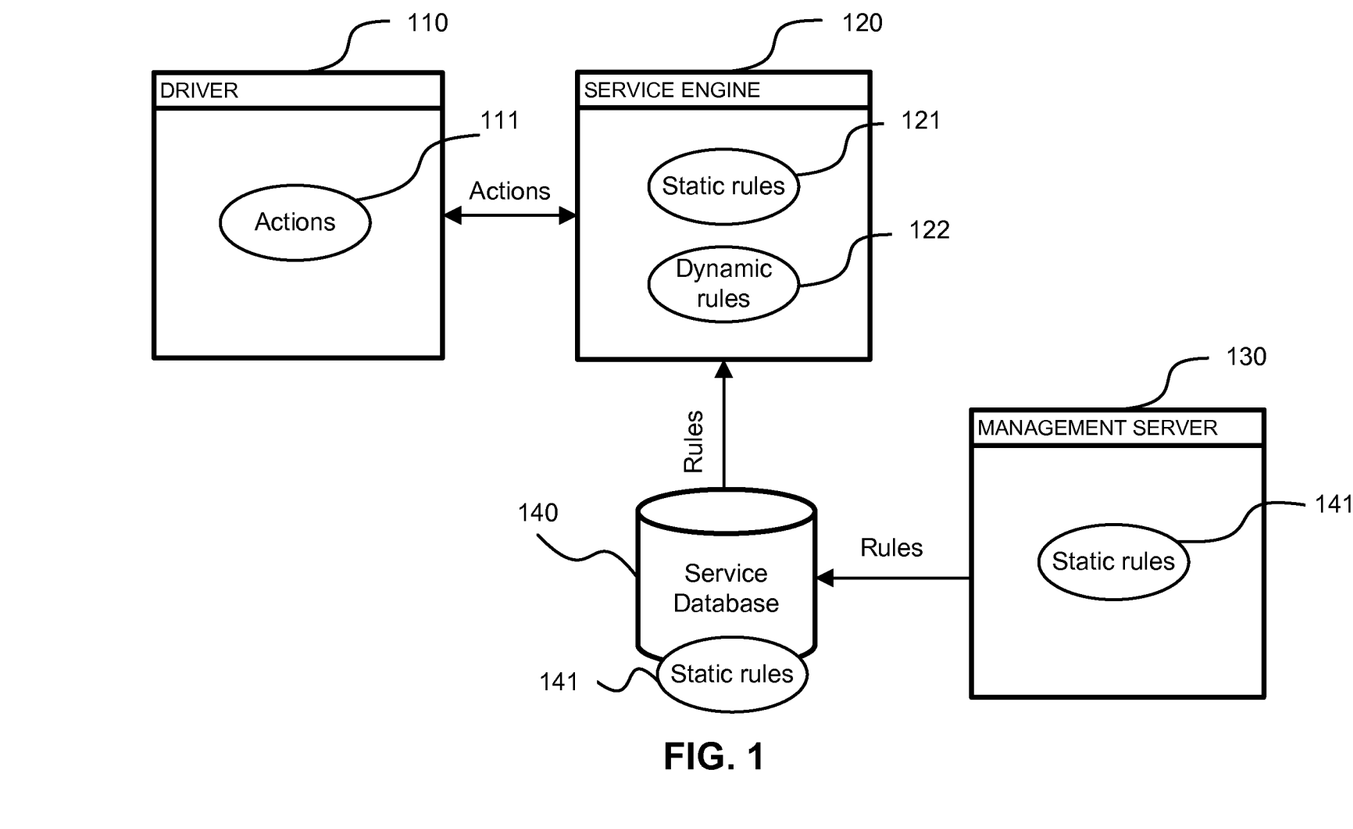
FIG. 1 illustrates a system architecture, in accordance with the exemplary embodiment.

FIG. 1 illustrates system architecture, in accordance with the exemplary embodiment. A driver 110 monitors and intercepts actions 111 of an executable component. The actions are compared against static and dynamic behavior rules 121 provided by service engine 120. The static rules 141 are generated by a security management server 130 and stored in a service database 140. The static rules 121 activated upon a system startup are a subset of the static rules 141 from the service database 140. Note that use of a security server is optional for standalone systems.

After the actions 111 of the suspected component are compared against the static rules 121, a directive for additional rules is generated by the driver 110. Then, dynamic rules 122 are loaded from the service database 140 on-the-fly and are nested with static rules 121. The dynamic rules 122 are a subset of the static rules 141 provided by the security management server 130. Thus, the proposed architecture advantageously allows using a minimal amount of rules at system startup and dynamically adding some rules at runtime based on actions performed by malware or suspected malware components.

Figure 2:
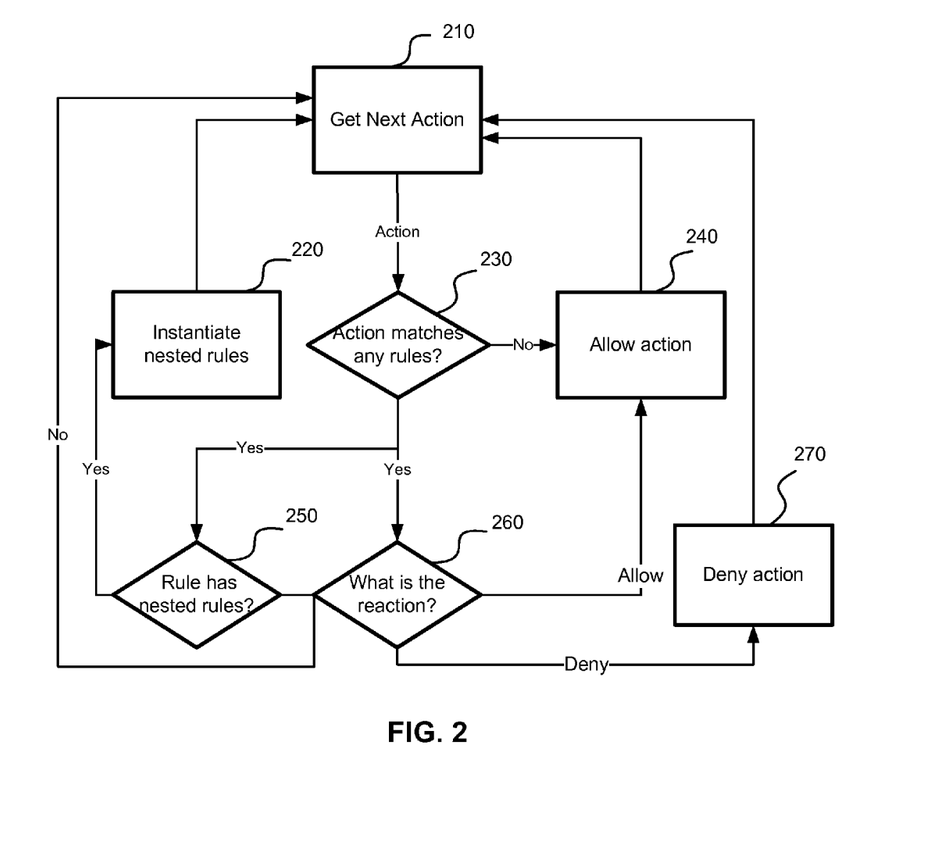
FIG. 2 illustrates a flow chart of a method for using nested rules, in accordance with the exemplary embodiment.

FIG. 2 illustrates a flow chart of a method for using dynamically nested rules, in accordance with the exemplary embodiment. In step 210, a new action is detected. The action is compared against behavior rules in step 230. If the action does not match any rules, it is allowed at step 240 and the next action is detected at step 210. If the action matches at least one of the rules in step 230, the rule is analyzed for presence of the nested rules in it, in step 250. If the rule has the nested rules in it, the nested rules are instantiated in step 220 and the action is compared against these rules as well.

Based on the rules the reaction directive is generated in step 260. If the directive is to allow the action, the action is allowed in step 240. If the directive is to deny the action, the action is denied in step 270 and the next action is detected in step 210.

Figure 3:
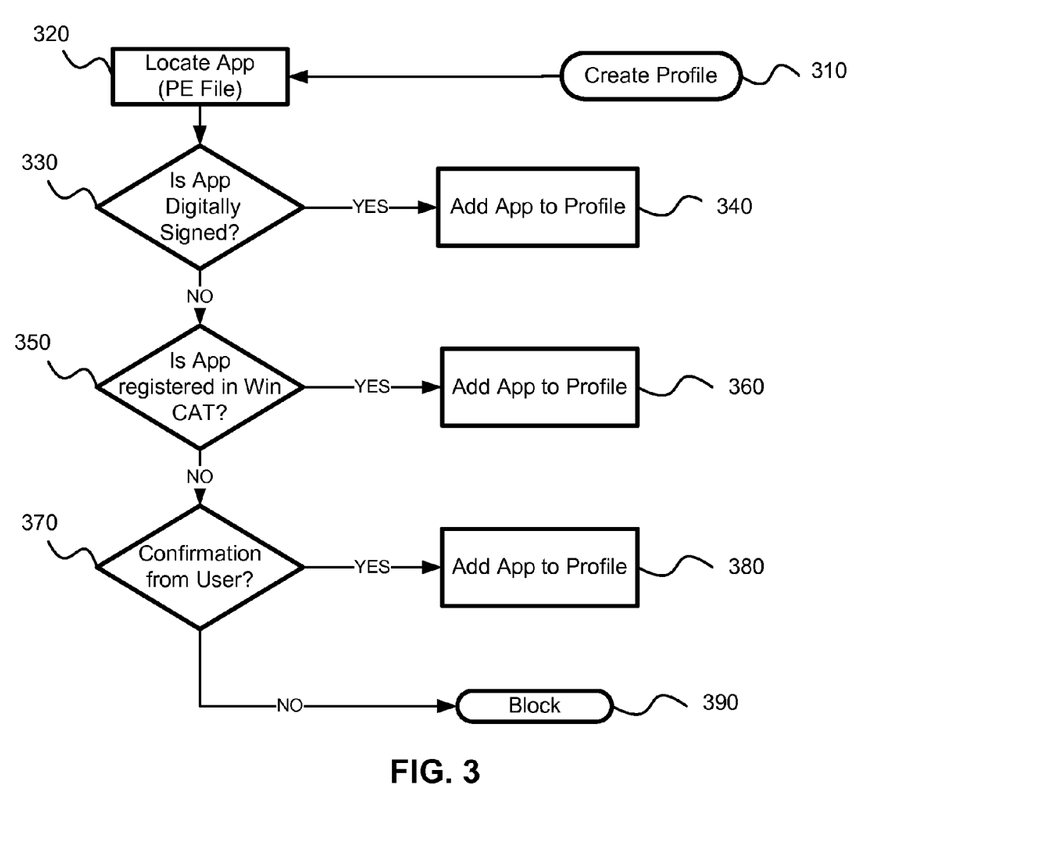
FIG. 3 illustrates a flow chart of an application installation process, in accordance with the exemplary embodiment.

The security system of the exemplary embodiment can also be used when a new application is installed on a computer system. FIG. 3 illustrates a flow chart of an application installation process, in accordance with the exemplary embodiment. Prior to installing an application, a security profile is created by a user via GUI in step 310. A security driver locates the application (i.e., Portable Executable—PE file) in step 320.

If the security driver determines that the application is digitally signed (see step 330), the application is added to the security profile by a service engine in step 340. Otherwise, the security driver checks if the application is registered in Win CAT in step 350. If the application is registered in Win CAT, it is added to the security profile in step 360. Otherwise, the application is checked for being malicious by extended AV asking for a confirmation from a user in step 370. If the user confirmation is received (i.e., application is determined not to be malicious) in step 370, the application is added to the security profile in step 380. If no confirmation is received (i.e., the application is deemed to be malicious), it is blocked in step 390. According to the exemplary embodiment, the malware determination in step 370 is made based on the fact that the application at least does not meet the criteria set forth in steps 330 and 350 and the user confirms it.

Figure 4:
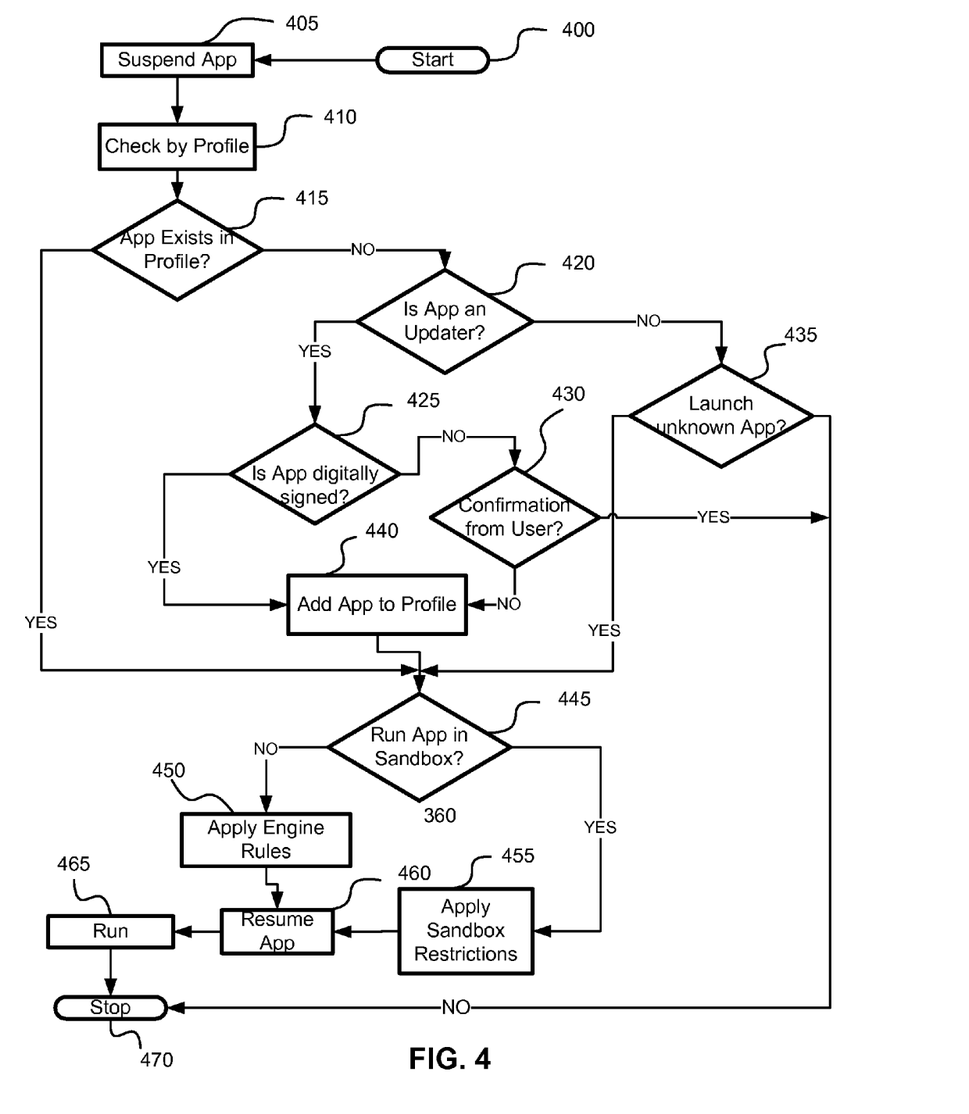
FIG. 4 illustrates a flow chart of runtime processing of an application, in accordance with the exemplary embodiment.

In one embodiment, security measures are implemented with an application that is installed and running on the system. FIG. 4 illustrates a flow chart of runtime processing of an application, in accordance with the exemplary embodiment. Security processing is started in step 400. The application is suspended in step 405. The application is checked by a security profile in step 410. In step 415, it is determined if the application exists in the profile. If the application exists, it is run in a sandbox in step 445. If the application does not run in the sandbox, engine rules are applied in step 450 and the application resumed in step 460.

If the application is run in the sandbox, the sandbox restrictions are applied in step 455 and the application is resumed in step 460. After the application is resumed it is run in step 465 until it stops in step 470.

If in step 415, it is determined that the application does not exist in the profile, the application is checked for being an updater in step 420. If the application is not an updater, the unknown application is launched in step 435. If the application launches in step 435, it is sent for execution in the sandbox (see step 445).

If in step 420, it is determined that the application is an updater, the application is checked for being digitally signed in step 425. If the application is signed, it is added to the profile in step 440. If the application is not signed and it is confirmed by the user (via AV module) in step 430, the application is terminated in step 470. If the user does not confirm that the application is not signed in step 430, it is added to the profile in step 440 and then sent to the sandbox (see step 445).

The sandbox is used in step 445 so that the application can be started by a user at least in the isolated environment, if it cannot be run otherwise due to the security reasons. The sandbox is an alternative option to blocking the application that allows a user to run the application safely.

The dynamic rule engine of the exemplary embodiment is universal and can be configured so the rules act as a white list or a black list. Use of dynamically nested behavioral rules described in such a way that new rules can be instantiated as a reaction to an action or event triggered by an application or an executable component. The dynamic rules can be created on-the-fly during anti-virus processing without any updates from a server.

The dynamic rules are in essence subsets of the static rules that exist in inactive (i.e., sleeping) state in the service database. The inactive rules are activated and merged (i.e., nested) with the static rules when a particular chain of actions or events occurs. The inactive rules can be stored as templates. The inactive rules can have activation variables that are filled at rule instantiation. Note that the individual actions or events in the chain can be harmless, while the sequence of these actions is malicious.

For example, if an application reads some sensitive information from a particular folder, this action is deemed not harmful and is allowed. However, if the same application subsequently attempts to establish a network connection, this action needs to be blocked. Thus, a new rule forbidding the application to gain network access needs to be introduced on-the-fly, based on the fact that the application has accessed some sensitive data prior to attempting to access the network. Alternatively, the exemplary embodiment can be used as administration tool for protecting against malicious actions of a user.

The exemplary embodiments are directed to heuristic analysis of the known malware components. According to the exemplary embodiment, dynamically nested behavioral rules allow describing and detecting the behavior of multi-modular or polymorphic malware components. Those skilled in the art will appreciate that the proposed embodiment provides for effective malware detection using minimal amount or security rules and thereby saving system resources.

Figure 5:
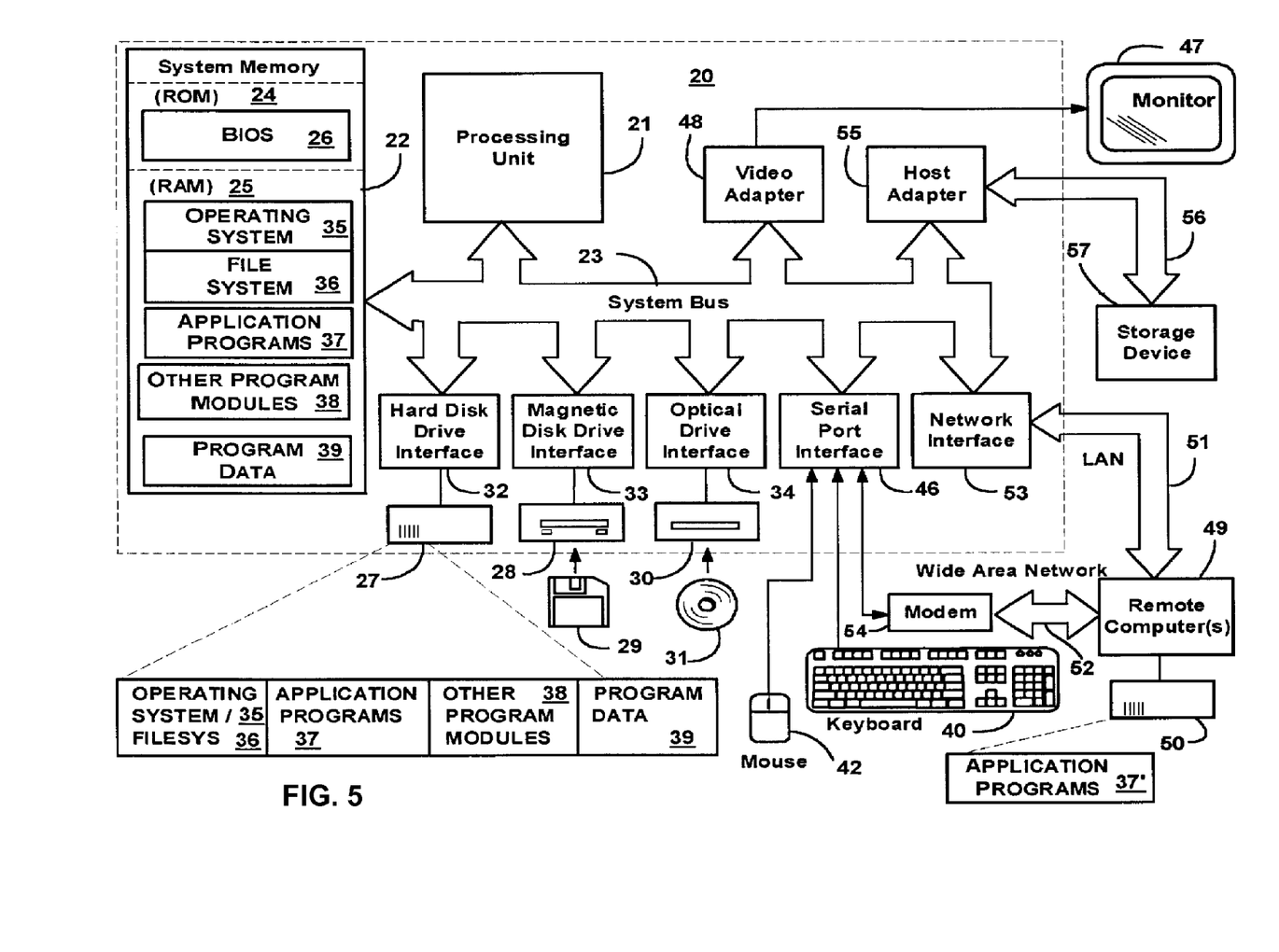
FIG. 5 illustrates a schematic of an exemplary computer system on which the invention can be implemented.

With reference to FIG. 5, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection of malware with complex behavior patterns (such as, multi-modular or polymorphic malware components) using a minimum amount of system resources.

It should also be appreciated that various modifications, adaptations and alternative embodiments thereof may be made within the scope and spirit of the present invention. The invention is further defined by the following claims.

APPENDIX 1

Example of Nested Rule

```
<?xml version="1.0" encoding="utf-8"?>
<Storage>
  <Rules>
```

-continued

```
    <Rule name="Program X reads file A">
      <Event type="file" op="read">
        <File name="*\A" />
      </Event>
      <Reaction Activity="Allow">
        <Rule name="Program X reads file B">
          <Event type="file" op="read">
            <File name="*\B" />
          </Event>
          <Processes>
            <Process name="%process%" />
          </Processes>
          <Reaction Activity="Allow">
            <Rule name="X writes to system registry key C">
              <Event type="reg key" op="write">
                <Key name="C" />
              </Event>
              <Processes>
                <Process name="%process%" />
              </Processes>
              <Reaction Activity="Allow">
                <Rule name="Y reads registry key C">
                  <Event type="reg key" op="read">
                    <Key name="C" />
                  </Event>
                  <Reaction Activity="Allow">
                    <Rule name="Y opens network connection to peer D">
                      <Event type="net connect">
                        <Connect url="*\D" />
                      </Event>
                      <Processes>
                        <Process name="%process%" />
                      </Processes>
                      <Reaction Activity="Deny">
                        <Rule name="Block future execution of X">
                          <Event type="process start">
                            <Process name="%process%" />
                          </Event>
                          <Reaction Activity="Deny">
                          </Reaction>
                        </Rule>
                      </Reaction>
                    </Rule>
                  </Reaction>
                </Rule>
              </Reaction>
            </Rule>
          </Reaction>
        </Rule>
      </Reaction>
    </Rule>
  </Rules>
</Storage>
```

Other examples of nested rules are as follows:

```
- <Storage>
- <Rules>
- <Rule id="1" name="typical rule">
- <Events>
- <Event type="file" op="Create,Read">
  <File name="C:\AUTOEXEC.BAT" />
  <File name="C:\WINDOWS\*" />
  </Event>
  </Events>
- <Users>
  <User name="Adminstrator" />
  <User name="Safensec" />
  </Users>
- <Processes>
  <Process name="*iexploler.exe" />
  <Process name="*Firefox.exe" interit="1" />
  </Processes>
- <Periods>
  <Period from="8:00" to="17:00" days="Sat,Sun" />
  <Period from="14:00:00" to="15:0:5" days="Mon" />
  <Period from="23:55" to="24:00" />
  </Periods>
  <Reaction activity="Block" log="1" report="1" />
  </Rule>
- <Rule id="2" name="rule with nested rule">
```

```
<Event type="test"/>
<User name="test" />
- <Reaction activity="Allow" log="1">
- <Rule id="11" name="dynamic rule" lifetime="10000">
<Event type="test" />
<User name="testDyn" />
<Reaction activity="Block" />
  </Rule>
  </Reaction>
  </Rule>
- <Rule id="3" name="multiply nested rules">
<Event type="test" />
<User name="test3" />
- <Reaction activity="Allow">
- <Rule id="31" name="dynamic Rule 1">
  - <!--
  no lifetime - shall live forever
  -->
<Event type="test" />
<User name="testDyn31" />
- <Reaction activity="Block">
- <Rule id="32" name="dynamic Rule 2" lifetime="10000">
<Event type="test" />
<User name="testDyn32" />
- <Reaction activity="Allow">
- <Rule id="33" name="dynamic Rule 3" lifetime="10000">
<Event type="test" />
<User name="testDyn33" />
<Reaction activity="Block" log="1" />
  </Rule>
  </Reaction>
  </Rule>
  </Reaction>
  </Rule>
  </Reaction>
  </Rule>
- <Rule id="4" name="rule that instantiates dynamic rule using CURRENT event data">
<Event type="test" />
<User name="test4" />
<Process name="ndn.exe" />
- <Reaction activity="Allow">
- <Rule id="41" name="dynamic rule 41">
<Event type="test" />
<User name="test41" />
<Process name="<current:process>" />
<Reaction activity="Block" />
  </Rule>
  </Reaction>
  </Rule>
- <Rule id="5" name="rule which happens with specific frequency" freq="2" freqperiod="10">
<Event type="test" />
<User name="test5" />
<Reaction activity="Block" />
  </Rule>
- <Rule id="6" name="rule with flag (rule applies only when flag is set)">
<Event type="test" />
<User name="test6" />
<Flag name="flag1" />
<Reaction activity="Block" log="1" />
  </Rule>
- <Rule id="7" name="rule sets the flag">
<Event type="test" />
<User name="test61" />
- <Reaction activity="Allow" log="1">
<Flag name="flag1" lifetime="21" />
  </Reaction>
  </Rule>
- <Rule id="8" name="and that rule disables it">
<Event type="test" />
<User name="test64" />
- <Reaction activity="Allow" log="1">
<Flag name="flag1" set="Off" />
  </Reaction>
  </Rule>
  </Rules>
  </Storage>
```

As another example, the trojan application Troj/BagleDl-U performes the following sequence of actions:

1. When first run Troj/BagleDl-U copies itself to <Windows system folder>\winshost.exe and creates the file <Windows system folder>\wiwshost.exe.

2. Creates the following registry key: HKCU\Software\Microsoft\Windows\CurrentVersion\Run\winshost.exe=<Windows system folder>\winshost.exe 3. Sets the following registry entry: HKCU\Software\FirstRun\FirstRunRR to "1"

4. Attempts to terminate processes and services and to delete registry entries related to security and anti-virus programs.

5. Overwrites the HOSTS file with the following single line to overwrite any settings: 127.0.0.1 localhost 6. Attempts to download and execute files from a number of remote websites to <Windows folder>\_re_file.exe.

The following static rule with nested behavioral rules monitors only one file system activity event that leads to monitoring of another Windows registry related event and only after suspected trojan application is caught on injecting itself into Windows registry the rule applies security measures such as blocking all further registry activities, protecting the HOSTS file, and blocking any internet access for the detected trojan process:

```
<?xml version="1.0" encoding="utf-8"?>
<Storage>
  <Rules>
    <Rule name="Creating wiwshost.exe">
      <Event type="file" op="create">
        <File name="\wiwshost.exe" />
      </Event>
      <Reaction Activity="Allow">
        <Rule name="Injecting wiwshost.exe into registry">
          <Event type="reg key" op="create" name="HKCU\Software\Microsoft\Windows\CurrentVersion\Run\winshost.exe">
          </Event>
          <Processes>
            <Process name="%process%" />
          </Processes>
          <Reaction Activity="Block">
            <Rule name="Block further registry activity">
              <Event type="reg value" op="*">
              </Event>
              <Processes>
                <Process name="%process%" />
              </Processes>
              <Reaction Activity="Block" />
            </Rule>
            <Rule name="Protect HOSTS file">
              <Event type="file" op="write">
                <Value name="*\HOSTS" />
              </Event>
              <Processes>
                <Process name="%process%" />
              </Processes>
              <Reaction Activity="Block"/>
            </Rule>
            <Rule name="Prevent trojan from accesing the internet">
              <Event type="net connect">
              </Event>
              <Processes>
                <Process name="%process%" />
              </Processes>
              <Reaction Activity="Block"/>
            </Rule>
          </Reaction>
        </Rule>
      </Reaction>
    </Rule>
  </Rules>
</Storage>
```

What is claimed is:

1. A method for protecting against malware using heuristic analysis, the method being performed on a computer having a processor and a memory, the method comprising performing the following:
   (a) creating a set of static behavioral rules;
   (b) launching an executable component on the computer;
   (c) detecting an attempt to launch a process from a file by the executable component;
   (d) comparing the attempt against the static behavioral rules and allowing the attempt if the action does not match the rules;
   (e) if the attempt matches at least one rule, generating a reaction directive;
   (f) executing the reaction according to the directive;
   (g) based on the attempt, generating a rule directive for additional dynamic rules;
   (h) acquiring the dynamic rules corresponding to the rule directive and nesting the dynamic rules within the static rules,
   wherein the dynamic rules are a subset of the static rules that are inactive, and are introduced into a security system and are activated and nested within the static rules upon an occurrence of the attempt when an individual attempt is not malicious but a sequence of events is malicious, and
   wherein the dynamic rules have a finite lifetime and are enforced only during the finite lifetime, and
   wherein parameters of the dynamic rules depend on execution of the static rules; and
   (i) repeating steps (d)-(h) for subsequent attempts,
   wherein steps (a) through (i) are performed on the computer.

2. The method of claim 1, further comprising instantiating a previously nested rule and applying it to the action.

3. The method of claim 1, further comprising creating a security profile for executable components for checking subsequent components against the profile.

4. The method of claim 3, further comprising adding the executable component to the profile if the component has a valid digital signature.

5. The method of claim 4, further comprising running the executable component inside a sandbox.

6. The method of claim 1, wherein the reaction is any of:
   allowing the attempt; and
   blocking the attempt.

7. The method of claim 1, wherein the static rules are instantiated at a startup.

8. The method of claim 1, wherein the dynamic rules are acquired and instantiated at runtime.

9. The method of claim 1, wherein the dynamic rules are selected from a plurality of inactive static rules.

10. The method of claim 1, wherein the rule directive is generated based on a heuristic analysis of the executable component.

11. The method of claim 1, wherein the reaction directive is generated based on the rules matched by the action.

12. The method of claim 1, wherein each individual attempt is harmless and a sequence of attempts is malicious.

13. A system for protecting against malware, the system comprising:
   a driver installed on a computer system having a processor and a memory, for intercepting actions performed by components executed on the computer system;
   a service engine having a plurality of static rules coupled to the driver;
   a service database accessible by the service engine; and
   a management server connected to the service database,
   wherein:
      the management server generates a plurality of static rules and provides them to the service database;
      the driver detects actions performed by a component executing on the computer system and provides the actions for analysis to the service engine, wherein the actions include an attempt to launch a process from a file, and wherein:
      the service engine compares actions against static and currently instantiated dynamic rules and based on comparison acquires some dynamic rules from the database; and
      the dynamic rules are nested with the static rules and applied to the subsequent actions executed on the computer system,
   wherein the dynamic rules are a subset of the static rules that are inactive, and are introduced into the system and are activated and nested within the static rules upon an occurrence of the action when an individual action is not malicious but a sequence of events is malicious,
   wherein parameters of the dynamic rules depend on execution of the static rules, and
   wherein the dynamic rules have a finite lifetime and are enforced only during the finite lifetime.

14. The system of claim 13, wherein the static rules are instantiated at startup of the computer system.

15. The system of claim 13, wherein the dynamic rules are acquired and instantiated in run-time.

16. The system of claim 13, further comprising a sandbox, wherein the component is executed.

17. The system of claim 13, wherein the actions are allowed if they do not match any rules.

18. The system of claim 13, wherein the actions are blocked if they match at least one static rule or at least one dynamic rule.

* * * * *